Nov. 10, 1931.  H. C. RICE  1,831,138
SHOCK ABSORBER
Filed Jan. 25, 1929  2 Sheets-Sheet 2

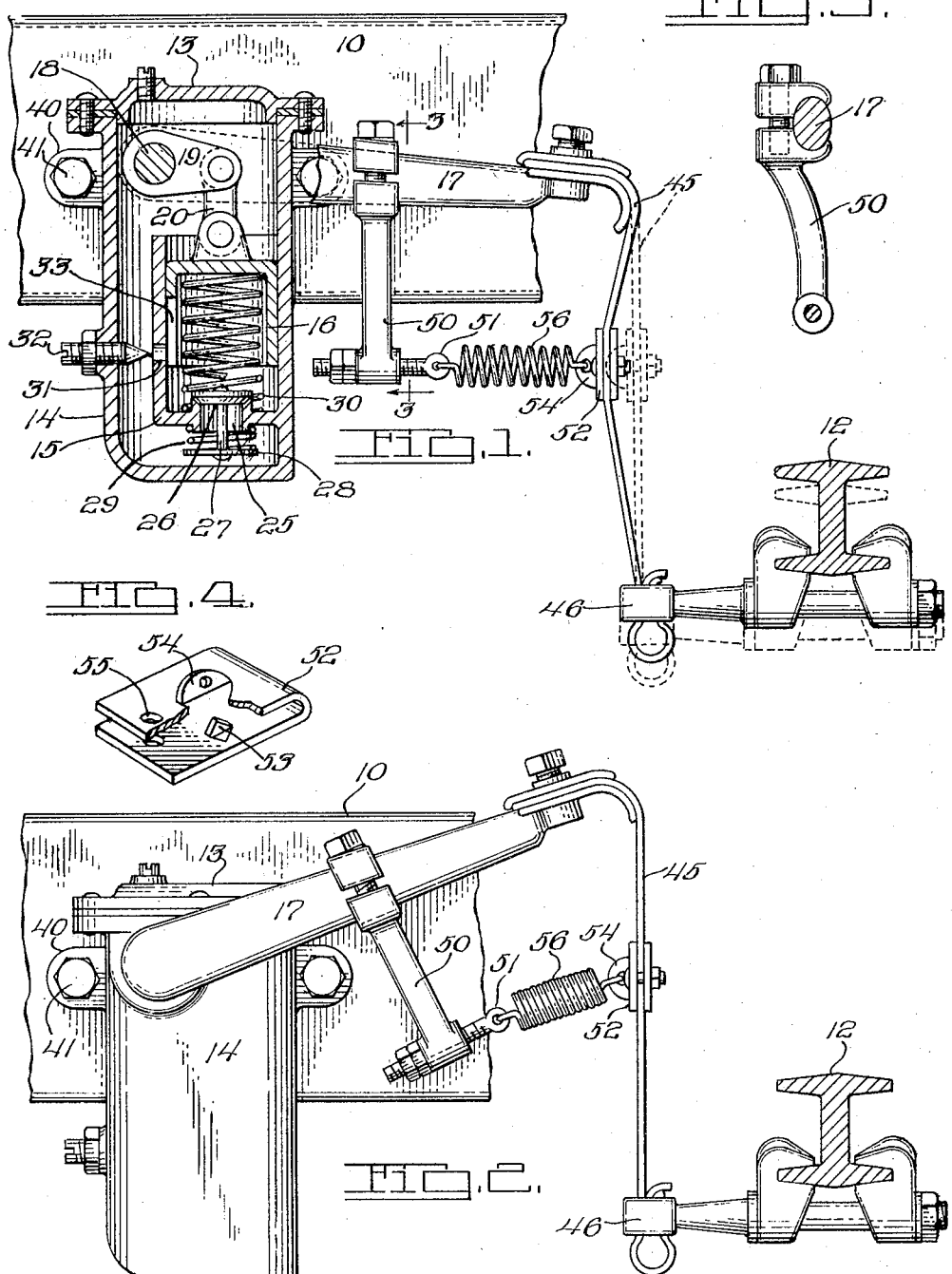

INVENTOR
Herbert C. Rice
BY
Harness, Dickey & Pierce
ATTORNEY

Patented Nov. 10, 1931

1,831,138

UNITED STATES PATENT OFFICE

HERBERT C. RICE, OF DETROIT, MICHIGAN

SHOCK ABSORBER

Application filed January 25, 1929. Serial No. 334,927.

This invention relates to shock absorbers which are chiefly employed in connection with motor vehicles in which springs are interposed between the running gear and the body of the vehicle, and which tend to retard and cushion the reaction of the springs in returning the body to normal position relative to the running gear after distortion of the springs.

One of the principal difficulties encountered in connection with the use of shock absorbers is to provide a free center for the shock absorber of sufficient scope to permit the free action of the vehicle springs during those minor axle movements set up when the vehicle is passing over slightly rough and choppy road surfaces, and still retain the resistance necessary to control satisfactorily the reaction of the springs when the axle encounters major shocks.

The principal object of this invention is to provide means which will substantially neutralize the resistance of the absorber during minor spring deflections and allow the vehicle springs free play, and which will not affect its resistance during major spring reactions.

With this and other objects in view, my invention consists in the arrangement, combination and construction of the various parts of my improved device, as described in the specification, claimed in my claims, and shown in the accompanying drawings, in which:

Fig. 1 is a side elevation of a shock absorber partly in section attached to the conventional vehicle members, and in neutral position, and embodying my device.

Fig. 2 is a side elevation similar to Fig. 1 and showing the absorber at the beginning of its operative position, and embodying my invention.

Fig. 3 is a view taken on the line 3—3 of Fig. 1.

Fig. 4 is a perspective, having parts broken away of one of the connections embodied in my device.

Figure 5:
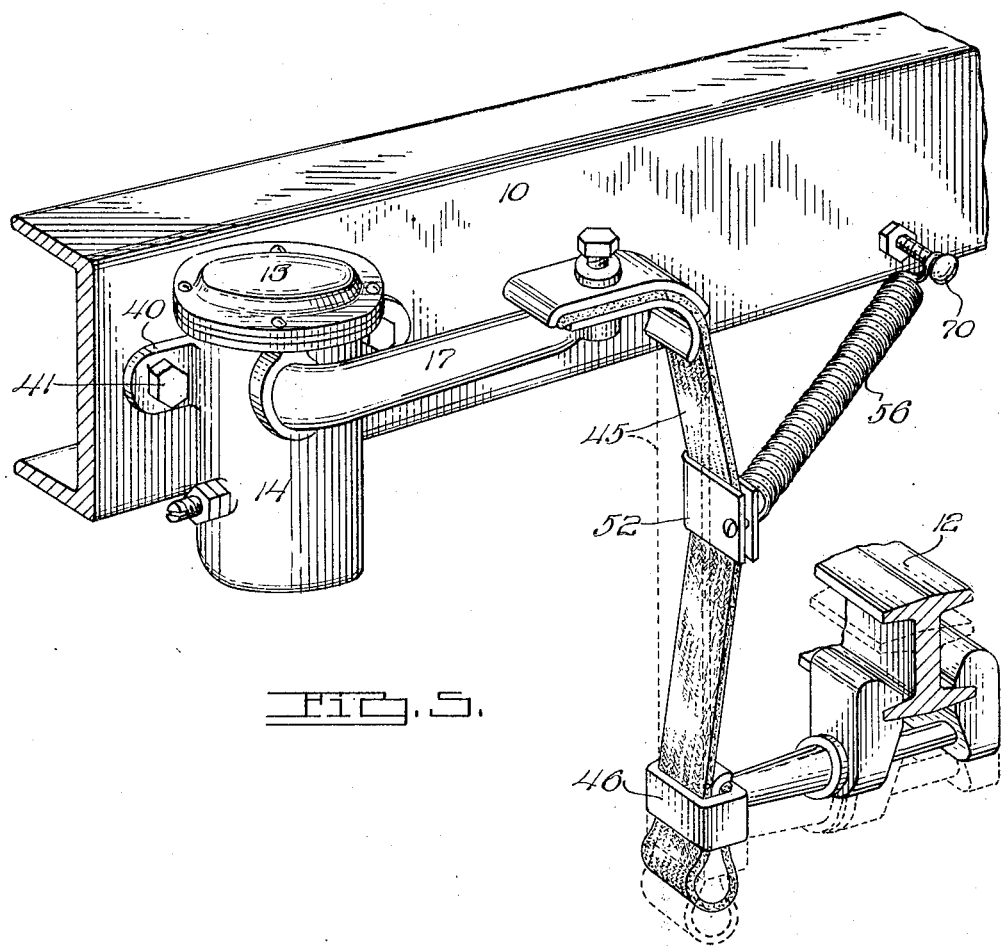
Fig. 5 is a perspective of a shock absorber connected with the conventional vehicle members, and embodying a modification of my device.

The numeral 10 designates the chassis or under frame of the vehicle body. The numeral 12 designates an axle of the running gear. The numeral 13 designates the conventional type of one-way hydraulic shock absorber which comprises a casing 14 having a cylinder 15 formed therein, a piston 16 operable in the cylinder, and actuator arm 17 connected at one end to a rock shaft 18 which extends into the upper part of the casing 14 and which is connected inside the casing by links 19 and 20 to the piston 16. In the lower part of the cylinder 15 is a flanged aperture 25 having a valve seat formed in its upper end, and a valve 26 is normally seated thereon. The valve 26 is provided with a stem 27 which extends downwardly through the aperture 25 and supports on its lower end a washer or plate 28. Between the washer 28 and the bottom of the cylinder 15 is positioned a coil spring 29 normally tensioned to retain the valve 26 on its seat. Within the cylinder and immediately above and around the valve 26 is positioned a coil spring 30 which extends between the bottom of the cylinder and the upper end of the piston 16 and is normally tensioned to force the piston upwardly in the cylinder. The cylinder is provided with an outlet aperture 31 which is positioned opposite a screw plug 32 in the side of the casing. The screw plug 32 may be turned to regulate the size of the aperture 31 and the flow of oil therethrough. The piston 16 has a slotted opening 33 in its side which registers with the aperture 31 in all movements of the piston. The casing 14, including the cylinder 15, is filled with oil to a predetermined level. The casing is bolted to the frame 10 by means of lugs 40, positioned on each of its sides, through which extend bolts 41. Attached to the free end of the actuator arm 17 is a flexible connection in the form of a strap 45 which has its other end attached to the anchor member 46 which is clamped to the axle 12. Rigidly secured to the intermediate portion of the actuator arm 17 is an arm 50 which depends from the actuator arm and has an eye bolt 51 adjustably positioned in its lower end. Attached to the flexible strap 45 intermediate its ends is a metal clamp 52 generally U-shaped in cross section, and which has a point 53 struck inwardly on one side and an eyelet 54 struck outwardly on the other side. The ends of the U legs have registering apertures 55 formed therein. The clip is slipped over the strap 45 and secured thereto by a bolt inserted through the apertures 55 which draws the point 53 into the strap and prevents slippage. A coil spring 56 has one end secured in the eye bolt 51 and the other end secured in the eyelet 54 of the clip member 52, and is tensioned by means of the adjustable eye bolt 51 to slightly depress the piston 16 and actuator arm 17 when they are in neutral position as shown in Fig. 1, to provide and resiliently control slack in the flexible strap 45.

The type of absorber described is now extensively used without the arms 50 and the spring 56 and their attendant coupling members 51 and 52, and in neutral position the strap 45 is held taut in a straight line between the actuator arm 17 and the coupling member 46. In such known form the device operates as follows:

When the springs, which are in actual practice interposed between and secured to the member 10 and the axle 12, but which are not shown here, are deflected, permitting the members 10 and 12 to approach each other, the spring 30 in the cylinder 15 forces the piston 16 upwardly, which produces a partial vacuum in the cylinder 15 sufficient to raise the valve 26 to permit oil in the casing 14 to flow through the valve opening 25 into the cylinder 15. This action throws the outer end of the actuator arm 17 upwardly to the position shown in Fig. 2. Upon reaction of the springs the members 10 and 12 are forced apart, causing the strap 45 which is anchored to the member 12, to depress the end of the actuator arm 17, thus causing the piston 16 to move downwardly in the cylinder 15 to close the valve 26 and force the oil in the cylinder 15 outwardly through the slotted opening 33 and the aperture 31 into the main casing 14. The aperture 31 being relatively small, restricts the passage of oil therethrough into the casing 14 and thereby retards the movement of the piston 16 downwardly, which has the effect of retarding the movement of the actuator arm 17 downwardly, and thus retards the action of the vehicle springs.

The operation just described prevails also in this improved device when the compression of the springs of the vehicle and the movement of the members 10 and 12 toward each other is a major one. However, in running over a slightly uneven road such as cobblestone pavement or similar choppy surface which causes a relatively minor and rapid vibration of the vehicle springs, the movement of the members 10 and 12 relative to each other has been found too rapid to cause the piston 16 to overcome the inertia of the oil confined in the cylinder 15 and casing 14, with the result that such rapid movements are almost rigidly resisted by the hydraulic mechanism. If the shock absorber is constructed and adjusted so that it will not retard the natural action of the vehicle springs during minor vibrations, its tendency is to offer insufficient resistance to the major vibrations. Various attempts have been made to eliminate the resistance of such absorbers to rapid minor movements of the vehicle members while retaining sufficient resistance to efficiently control the major movements of the members, by providing for diminished resistance within the cylinder and casing of the absorber to the movement of the piston during a portion of its operative stroke. The results obtained from such attempts are unsatisfactory for the reason that a part of the resistance necessary to efficiently control the action of the vehicle members in response to major shocks is sacrificed.

I have overcome these undesirable features by the use of the arm 50, spring 56 and their connections 51 and 52, or equivalent connections, for a supplemental effect. The spring 56 is tensioned to cause the strap 45 to slightly depress the piston 16 and the actuator arm 17 when the vehicle springs and the members 10 and 12, and consequently the shock absorber, are in normal or balanced position, as shown in Fig. 1. The spring 56 has sufficient tension to take up slack in the strap produced by minor upward movements of the axle 12 before the spring 30, which moves the piston 16 upwardly, can act, and it will expand and release the slack in response to an axle movement that, acting directly against the end of the arm 17, would be too rapid or of insufficient force to cause any material downward movement of the piston 16 against the resistance of the liquid in the cylinder 15. The spring 56 will also expand and contract with a rapidity that will accommodate the highest rate of axle movement permitted by the vehicle springs. When a major upward movement of the axle 12 occurs a greater amount of slack is produced in the strap 45 than the spring 56 will take up. This relieves the pressure on the spring 30 which immediately expands and forces the piston 16 and the arm 17 upward.

When the arm 17 moves upward it carries the depending end of the arm 50 toward the natural line of the strap 45, which relieves the effective tension of the spring 56 relative to the strap, which is then drawn taut in a straight line between the end of the arm 17 and the anchorage 46 on the axle 12. The spring 56 is preferably not of sufficient strength to offer any material resistance to reaction of the vehicle springs, and having gone out of tension during a major movement and before the beginning of the operative downward stroke of the piston 16 from such a limiting position as is implied in Fig. 2, it has no part in the operative function of the absorber in resisting the major reactions of the vehicle springs. The operation of the spring 56 therefore provides a free center for the shock absorber, in which the vehicle springs are allowed free play, and which may be increased or lessened by adjusting the eyebolt 51 relative to the arm 50 to increase or lessen the tension of the spring, and this construction permits the shock absorber to be adjusted to take care of the major shocks without regard for the effect of such adjustment relative to minor shocks.

In Fig. 5 I have shown a modification in which the spring 56 instead of being anchored to the actuator arm 17, is anchored to the chassis frame 10 by means of a bolt or pin 70. It is anchored as before described, to the strap 45 by means of a clip 52 in the same relative position. In this modification a major movement of the frame 10 and the axle 12 toward each other, permitting the actuator arm to move upwardly, moves the point at which the spring 56 is attached to the strap 45 nearer the fixed anchor 70 provided for the opposite end of the spring 56, thereby relieving the tension of the spring 56 and rendering it inactive upon the upward movement of the actuator arm 17. The spring 56 may be anchored at any point on the vehicle members adjacent the shock absorber, or on the shock absorber, which approaches its point of attachment to the strap 45 when the actuator arm 17 moves upward, by reason of a corresponding major movement of approach between members 10 and 12, or the like.

Formal change may be made in the specific embodiment of the invention described without departing from the spirit or substance of the broad invention, the scope of which is commensurate with the appended claims.

What I claim is:

1. In combination with two relatively movable members having springs interposed therebetween, and hydraulic means for cushioning the action of said springs caused by distortion thereof, secured to one of said members and having a flexible connection with the other of said members; means engaging said flexible connection and rendering the same resiliently responsive to said springs during movements insufficient to overcome the inertia of said hydraulic means in balance, and adapted to become relatively ineffective upon limited major movements of said hydraulic means from position of balance.

2. In combination with two relatively movable members having springs interposed therebetween, and hydraulic means for cushioning the action of said springs caused by distortion thereof, secured to one of said members and having a flexible connection with the other of said members; means resiliently distorting said flexible connection and rendering the same responsive to said springs during movements insufficient to overcome the inertia of said hydraulic means in balance, and releasing said distortion upon limited major movements of said hydraulic means from position of balance.

3. In combination with two relatively movable members having springs interposed therebetween, and hydraulic means for cushioning the action of said springs caused by distortion thereof, secured to one of said members and having a flexible connection with the other of said members; means resiliently distorting said flexible connection and rendering the same responsive to said springs during movements insufficient to overcome the inertia of said hydraulic means in balance, said distorting means becoming relatively ineffective upon limited major movements of said hydraulic means from position of balance.

4. In combination with two relatively movable members having springs interposed therebetween, hydraulic means secured to one of said members adapted to retard the diverging action of said springs resulting from distortion, a flexible member operatively connecting said hydraulic means to the other of said members, means for resiliently distorting said flexible member and rendering the same responsive to said springs during movements insufficient to overcome the inertia of said hydraulic means in balance, said distorting means adapted to become relatively ineffective upon limited major movements of said hydraulic means from position of balance.

5. In combination with two relatively movable members having springs interposed therebetween, hydraulic means secured to one of said members adapted to retard the diverging action of said springs resulting from distortion, an actuator arm operatively connected to said hydraulic means, a flexible member connecting said actuator arm to the other of said movable members, means for resiliently distorting said flexible member and rendering the same responsive to said springs during movements insufficient to overcome the inertia of said hydraulic means in balance, said distorting means adapted to become relatively ineffective upon limited major movements of said actuator arm from position of balance.

6. In combination with two relatively movable members having springs interposed therebetween, hydraulic means secured to one of said members adapted to retard the diverging action of said springs resulting from distortion, an actuator arm operatively connected to said hydraulic means, a flexible member connecting said actuator arm to the other of said movable members, a resilient member anchored to said actuator arm and engaging said flexible member and adapted to distort and render the same resiliently responsive to said springs during movements insufficient to overcome the inertia of said hydraulic means in balance, said resilient means being rendered relatively ineffective upon limited major movements of said actuator arm from position of balance.

7. In combination with two relatively movable members having springs interposed therebetween, hydraulic means secured to one of said members adapted to retard the diverging action of said springs resulting from distortion, an actuator arm operatively connected to said hydraulic means, a flexible member connecting said actuator arm to the other of said movable members, a resilient member anchored to one of said movable members and engaging said flexible member and adapted to distort and render the same resiliently responsive to said springs during movements insufficient to overcome the inertia of said hydraulic means in balance, and adapted to become relatively ineffective upon limited major movements of said actuator arm from position of balance.

8. In combination with two relatively movable members having springs interposed therebetween, hydraulic means secured to one of said members adapted to retard the diverging action of said springs resulting from distortion, an actuator arm operatively connected to said hydraulic means, a flexible member connecting said actuator arm to the other of said movable members, a resilient member anchored to that movable member which supports said hydraulic means and engaging said flexible member and adapted to distort and render the same resiliently responsive to said springs during movements insufficient to overcome the inertia of said hydraulic means in balance, and adapted to become relatively ineffective upon limited major movements of said actuator arm from position of balance.

9. In combination with two relatively movable members having springs interposed therebetween, hydraulic means secured to one of said members adapted to retard the diverging action of said springs resulting from distortion, an actuator arm operatively connected to said hydraulic means, a flexible member connecting said actuator arm to the other of said movable members, a resilient member anchored to said actuator arm and engaging the intermediate portion of said flexible member and adapted to distort and render the same resiliently responsive to said springs during movements insufficient to overcome the inertia of said hydraulic means in balance, and adapted to become relatively ineffective upon limited major movements of said actuator arm from position of balance.

10. In combination with two relatively movable members having springs interposed therebetween, hydraulic means secured to one of said members adapted to retard the diverging action of said springs resulting from distortion, an actuator arm operatively connected to said hydraulic means, a flexible member connecting the free end of said actuator arm to the other of said movable members, an anchor arm secured to and depending from said actuator arm, a resilient member secured to said anchor arm and engaging the intermediate portion of said flexible member and adapted to distort and render the same resiliently responsive to said springs during movements insufficient to overcome the inertia of said hydraulic means in balance, and adapted to become relatively ineffective upon limited major movements of said actuator arm from position of balance.

11. In combination, a pair of relatively movable spring connected parts, a shock absorber connected to one of said parts, a flexible connection between said shock absorber and the other of said parts, and means, secured to and cooperating with said connection, active to supplement the effect of said shock absorber during relatively small movements between said parts, said means being so secured as to become inactive during limited larger movements of approach between said parts.

12. In combination, a pair of relatively movable spring connected parts, a shock absorber connected to one of said parts, a flexible connection between said shock absorber and the other of said parts, and resilient means cooperating with said connection active to neutralize the resistance of said shock absorber during relatively small movements between said parts, and comparatively inactive during limited larger movements of approach between said parts.

13. In combination, a pair of relatively movable spring connected parts, a shock absorber connected to one of said parts, a flexible connection between said shock absorber and the other of said parts, spring means engaging said flexible connection and tensioned to eliminate the resistance of said shock absorber to relatively small movements between said parts, and comparatively inactive relatively to said shock absorber resistance during larger but limited movements of approach between said parts.

HERBERT C. RICE.